United States Patent [19]
Yamagishi et al.

[11] Patent Number: 5,790,219
[45] Date of Patent: Aug. 4, 1998

[54] COLOR LIQUID-CRYSTAL DISPLAY PANEL WITH BLACK-MASK OVERLAPPING COLOR-FILTER MORE ON DOWNWARDLY RUBBING SIDE OF SWITCHING ELEMENT

[75] Inventors: Nobuyasu Yamagishi; Yoshitaka Yamamoto, both of Ishikawa, Japan

[73] Assignee: Matsushita Electric Industrial Co., Ltd., Osaka, Japan

[21] Appl. No.: 542,189

[22] Filed: Oct. 12, 1995

[30] Foreign Application Priority Data

Oct. 13, 1994 [JP] Japan ............... 6-247698

[51] Int. Cl.⁶ ...................... G02F 1/1335; G02F 1/1333
[52] U.S. Cl. ............................. 349/106; 349/110
[58] Field of Search ............ 359/68, 67; 349/106, 349/110

[56] References Cited

U.S. PATENT DOCUMENTS

| | | | |
|---|---|---|---|
| 4,948,231 | 8/1990 | Aoki et al. | 359/68 |
| 5,162,901 | 11/1992 | Shimada et al. | 359/59 |

FOREIGN PATENT DOCUMENTS

| | | | |
|---|---|---|---|
| 0328329 | 8/1989 | European Pat. Off. | |
| 1-283515 | 11/1989 | Japan | 359/80 |
| 3-096919 | 4/1991 | Japan | 359/73 |
| 6-34965 | 2/1994 | Japan | |

OTHER PUBLICATIONS

SID International Symposium Digest of Papers, Boston, May 17–22, 1992, vol. 23, 17 May 1992 Society for Information Display, pp. 789–792, XP 000479120, Yamanaka H. et al. 'Integrated Black Matrix on TFT Arrays'.
Patent Abstracts of Japan, vol. 14, No. 25 (Jan. 1990), Abstract of JP 1-266512, Oct. 1989.

*Primary Examiner*—Anita Pellman Gross
*Attorney, Agent, or Firm*—McDermott, Will & Emery

[57] ABSTRACT

A color liquid-crystal display panel comprising switching elements, pixel electrodes, and feed wirings made of plural thinfilm layers deposited on the internal surface of one of the substrates, a color filter having an unevenness of more than 0.3 μm, a black mask, and a liquid-crystal layer disposed between said two substrates, wherein the length of overlap of the black-mask over the color filter for every pixel is slightly different at least in a direction within a plane parallel to said substrate in order to prevent the generation of inverse tilt domain in the rub-down area caused by an application of rubbing, attaining a high image quality without light leakage.

2 Claims, 7 Drawing Sheets

COLOR LIQUID-CRYSTAL DISPLAY PANEL WITH BLACK-MASK OVERLAPPING COLOR-FILTER MORE ON DOWNWARDLY RUBBING SIDE OF SWITCHING ELEMENT

FIELD OF THE INVENTION

The present invention relates to a high-performance active matrix type color liquid-crystal display panel to be incorporated in a display device of television or computer.

BACKGROUND OF THE INVENTION

Active matrix type color liquid-crystal display panels are now used extensively in portable personal computers, portable televisions, video movies, and larger demands thereof are expected in the near future in proportion to the larger demands for multimedia. Thus, the production of a high-performance color liquid-crystal display panel at higher yield is now essential.

A partial cross-sectional view of a general-purpose active matrix type color liquid-crystal display panel of relatively low resolution, wherein the red, green, and blue unit pixels are disposed in a delta pattern, is shown in FIG. 6.

In the liquid-crystal panel shown in FIG. 6, the surface of array substrate 6 on which switching element 1 consisting of thinfilm transistors, pixel electrode 2, charge storage capacitor 3, power feed wiring 4, and inter-insulation layer 5, are mounted, faces the surface of counter substrate 10 on which black-mask 7, and tri-color filter 8 consisting of red, green, blue pixels, and common electrode 9 are mounted, with the inside surfaces of said substrates sandwiching liquid-crystal 12 and a number of spacers 11 having a diamter of about 5 μm in-between Moreover, the internal surfaces of array substrate 6 and counter substrate 10 are coated with orientation layer 13 made of polymer resin such as polyimide respectively, and the surfaces of orientation layers 13 are oriented by applying an orientation process such as surface rubbing along a predetermined direction 14 is a polarizing plate.

FIG. 7 shows similarly a partial plane view of a conventional panel. As shown in FIG. 7, although the pattern of the opening of black-mask 7 is determined in correspondence to the pattern of pixel electrodes 2 formed on array substrate 6, the pattern of opening of the black-mask applied to a normally white mode is designed to be slightly smaller than the theoretical values considering a margin for misregistration possible at the lamination of said two substrates 2.

Moreover, color-filter 8 is prepared generally by using a pigment dispersion type photoresist using a base material of photosensitive acrylic resin, coated at a thickness of about 1.5 μm. The photoresist layer is then divided into color patterns of red, green, and blue pixels, and the joints of these patterns are aligned with the pattern of black-mask 7.

Furthermore, the positional relationship between the pattern of the opening of black-mask 7 and the pattern of color filter 8 is so determined that an overlap A of color-filter 8 on black-mask 7 is provided in black-mask 7 in advance in order to avoid the coincidence of non-colored parts of color-filter 8 with the opening of black-mask 7 even in a worst case, considering a patterning accuracy in manufacturing color-filter 8.

The length of said overlap A of color-filter 8 on black mask 7 is made identical with the length of either one of four sides of a pixel when dot-patterned color-filter 8 is employed, and it is made identical with the length of either one of two sides measured along the width of a pixel when strip-patterned color-filter 8 is employed.

Next, a manufacturing process of a general purpose liquid-crystal display panel is explained. At first, orientation layer 13 made of a polymer resin such as polyimide is coated on a predetermined area of counter substrate 10 provided with color-filter 8, black-mask, and common electrode 9 made of a transparent conductive thinfilm such as ITO by means of a printing method such as offset printing, and on a predetermined area of array substrate 8 provided with switching element 1, pixel electrode 2, and others, and these printed orientation layers are set by heating.

Then, after rubbing the surface of orientation layer 13 using a cloth such as rayon cloth along a predetermined direction, an epoxy resin system sealing material is coated along the entire edges of one of the substrates. After this, a number of spherical micro-spacers 11 having a diameter of several microns made of resin or silica, are scattered on one of said substrates at a density of about 200 per square millimeter, and said two substrates are bonded together by applying a pressure attaining at a positional accuracy of several microns, with the inside surfaces of said substrates sandwiching liquid crystal 12 and with said microspacers in between.

Next these substrates are kept at a press-bonding condition, heat is applied to set said sealing material constituting a cell, and liquid-crystal 12 is introduced into said cell through an inlet provided at a part of sealing material by employing a vacuum injection method. Next said inlet is sealed by using a ultra-violet setting resin, polarizing plate 14 of which polarizing axis is aligned with a predetermined direction is bonded on said two substrates, obtaining a liquid-crystal display panel.

However, with said color liquid-crystal display panel assembled by the above-described conventional processes, considerations on the relationship between the surface irregularity of color filter 8 and the surface irregularity components including switching elements 1, pixel electrodes 2, feed wiring 4, and the charge storage capacitors mounted on the internal surface of array substrate 6, and the relationship to the panel gap had been neglected on the panel design, despite a major contribution of protrusions formed on array substrate 6 and counter substrate 10 to the panel gap.

Therefore, many cases wherein said gap formed between two substrates is supported only by spacers 11 of limited numbers disposed on said protrusions formed on each of the two facing substrates are possible, and thus, the area forming a narrowest gap between said two substrates can be highly limited.

This means an application of concentrated stress on said spacers of limited numbers scattered around the neighboring area of switching element 1 located on the parts supporting said two substrates, causing serious problems of not only the breakage of switching elements 1, inter-insulation layers 5, or short circuits, but instabilities of display characteristics due to the irregular liquid-crystal 12 layer thickness caused by the deviations of gap and manufacturing process.

Moreover, a lowest possible distribution density of spacers 11 has to be provided in order to minimize the loss of image quality due to the light leakage through said spacer area.

Moreover, FIG. 8 shows a relationship between the direction of rubbing performed on orientation layer 13 and the direction of orientation of liquid crystal molecule disposed on a general-purpose liquid-crystal display panel.

In FIG. 8, since the upper part of feed wiring 4 takes a protruded shape on said array substrate, the pre-tilt angle of liquid-crystal molecule layer 15 formed by rubbing near to the part B where rubbing is performed downwardly (this part is called rub downed part hereafter), is smaller than that of the liquid-crystal formed in the other parts. Therefore, if the steps of the joints of color filter 8 are located on counter substrate 10, disturbances of the orientation of liquid-crystal 15 are more likely to cause reverse tilt domains or reverse twist domains.

Further, FIG. 9 shows an enlarged view of pre-tilt angle of liquid-crystal molecule layer 15 formed around a protrusion.

As shown in the drawing, when a step or an indented part of color filter 8 formed on counter electrode 10 faces part B formed on array substrate 6, the direction of pre-tilt angle of liquid-crystal molecule layer 15 disposed on that part takes an opposite direction to the pre-tilt angle of liquid-crystal molecule layers formed on the other parts. Therefore, the rise of a liquid crystal molecule in that part caused by a voltage application is in a direction opposite to the rise direction of liquid-crystal molecules on the other parts.

This domain is named inverse tilt domain. When inverse tilt domain is produced, light leakage through the boundary with the normal domain is possible, causing a large problem of severe degradation of display image quality particularly when this boundary coincides with the opening of black mask 7.

SUMMARY OF THE INVENTION

The purpose of the present invention is to obtain a high quality color liquid-crystal display panel of stable peformance.

The color liquid-crystal display panel of the invention has a panel construction where the lengths of an overlapped part of the color filter over the black-mask in a crosssectional view perpendicular to the substrate surface are slightly different for every pixel at least in one direction of the left-right and the up-down directions within a plane parallel to the substrate surface.

This means that the area supporting the two substrates by spacers, that is, the area of narrowest gap between said two substrates can be larger so that color liquid-crystal display panel having an even liquid-crystal layer and stable display image quality can be produced without the destruction of switching elements or inter-insulation layers.

Furthermore, the inverse tilt domain or inverse twist domain generated on the rub downed part produced by the rubbing of protrusions on the switching elements deposited on the array substrate can be eliminated, attaining a liquid-crystal display panel of high display quality with no light leakage.

DESCRIPTION OF PREFERRED EMBODIMENTS

A few of the embodiments of the invention are now explained below by referring the attached drawings.

The First Embodiment

Figure 1:
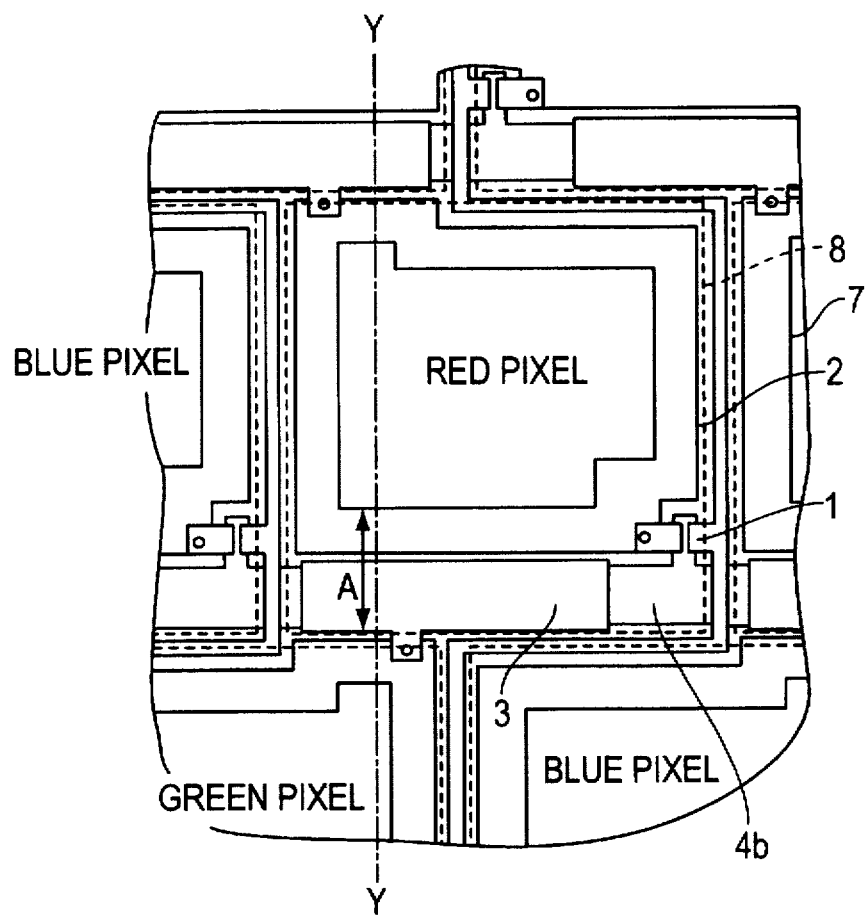
FIG. 1 is a plane showing a major part of color liquid-crystal display panel prepared according to the first embodiment of the invention.

FIG. 1 is a plane showing a major part of a color liquid crystal display panel of the first embodiment of the invention. The color liquid-crystal display panel explained here is an active-matrix type color liquid-crystal panel wherein the pixels corresponding to red, green, and blue colors are disposed in a shape of delta, and a dot-shaped planar color filter 8 is disposed on the internal surface of counter substrate 10 (FIG. 2).

A charge storage capacitor connected to pixel electrode 2 is disposed on gate wiring 4b. The pixel electrode 2 is made of ITO which is a transparent conductive layer, gate wiring 4b is made of chromium thinfilm, charge storage capacitor electrode is made of an aluminum thinfilm, and the thicknesses of each layer are 1500 Å, 1000 Å, and 4000 Å respectively. Moreover, a double layered inter-insulation layer consisting of $SiO_2$ and $SiN_x$ layers is disposed between the storage capacitor electrode 3 and the gate wiring 4b.

Figure 2:
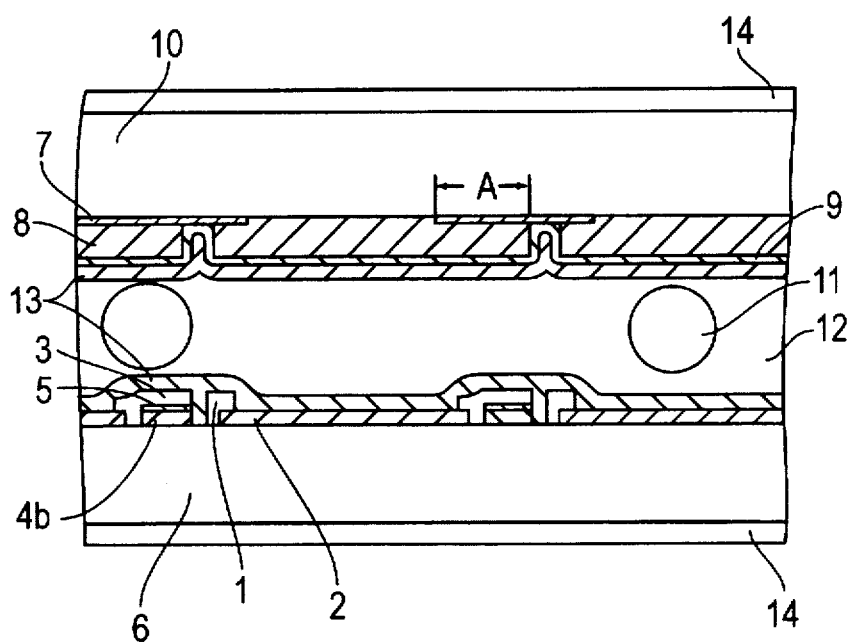
FIG. 2 is a cross-sectional view of the color liquid-crystal display panel of the same shown in FIG. 1.

FIG. 2 shows a cross-sectional view taken along the Y—Y direction shown in FIG. 1. The highest part on array substrate 6 is the upper part of the electrode of charge storage capacitor 3. On the other hand, the region housing color-filter 8 on counter electrode 10 is protruded in a plateau shape, and the length A of overlap of black-mask 7 over color-filter 8 is designed as large as possible in order to dispose color-filter 8 over the electrode of charge storage capacitor 3.

Since the width of black mask 7 is 65 μm, the length A of the overlap of black-mask 7 over color-filter 8 at the area facing the electrode of charge storage capacitor 3 is set to be 50 μm considering a margin of 5 μm for the alignment of black-mask 7 to the color-filter 8, and a margin of 10 μm for the joint between the adjoining color-filter 8.

By taking a construction of liquid-crystal panel shown in FIG. 1, a largest area providing a narrowest gap between these two substrates can be secured, and as a result of this, a larger number of spacers supporting these two substrates can be obtained, so that the possible breakage of switching element or inter-insulation layer 5 due to the application of concentrated stress on particular spacers 11 can be prevented, and thus, high-quality liquid-crystal display panels of a constant thickness of liquid-crystal layer 12 can be manufactured.

The Second Embodiment

A second embodiment of the invention is now explained below referring the attached drawings.

Figure 3:
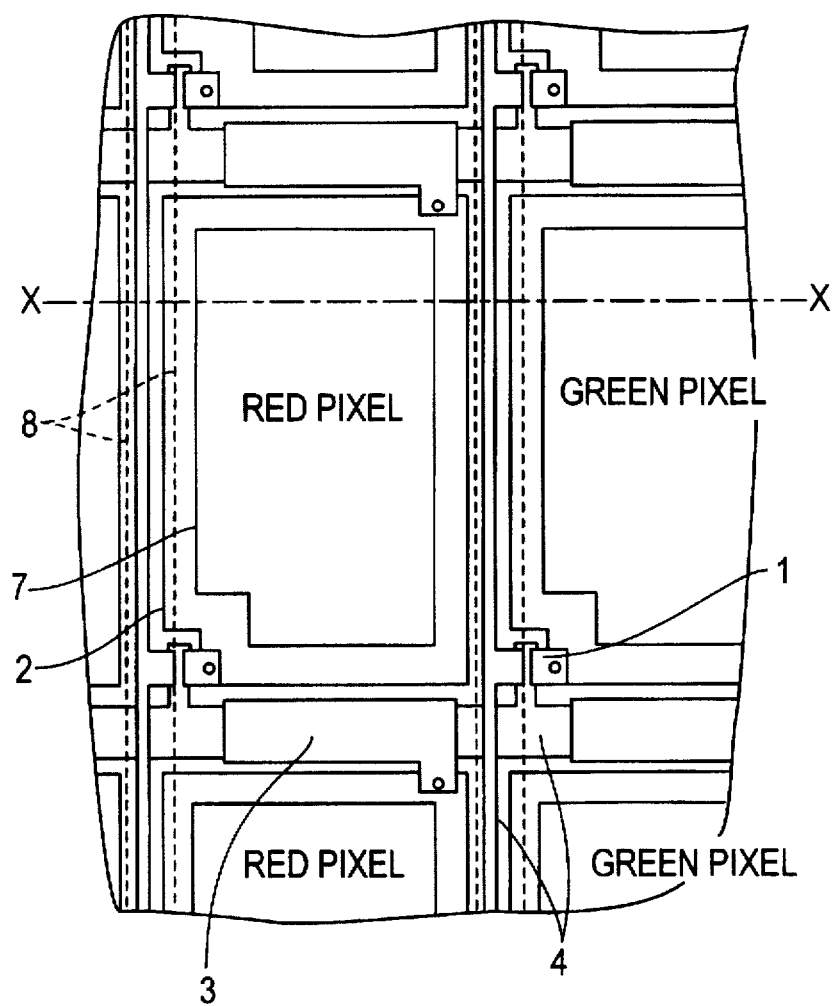
FIG. 3 is a plane showing a major part of color liquid-crystal display panel prepared according to the second embodiment of the invention.

FIG. 3 shows a part of a color liquid-crystal display panel of a second embodiment of the invention. Similar to the first embodiment of the invention, the second embodiment relates to a high-definition active-matrix type color liquid-crystal panel wherein the pixels each corresponding to red, green, or blue are disposed in a linear direction vertical to the image screen, and a stripe-shaped color filter 8 in which the arranged pixels are continuous in the vertical direction, is disposed on the internal surface of counter substrate 10.

As shown in FIG. 3, similar to the case of the first embodiment, the level of array substrate 6 is highest above the electrode of charge storage capacitor 3. However, since said vertically continuous stripe-shaped color-filter 8 is disposed on the area above counter electrode 10, the area providing a narrowest gap between these two substrates can be wide, and as a result of this, breakages of switching element 1 or instability of the liquid-crystal layer due to the application of concentrated stress on particular spacers 11 should not be a problem.

Figure 4:
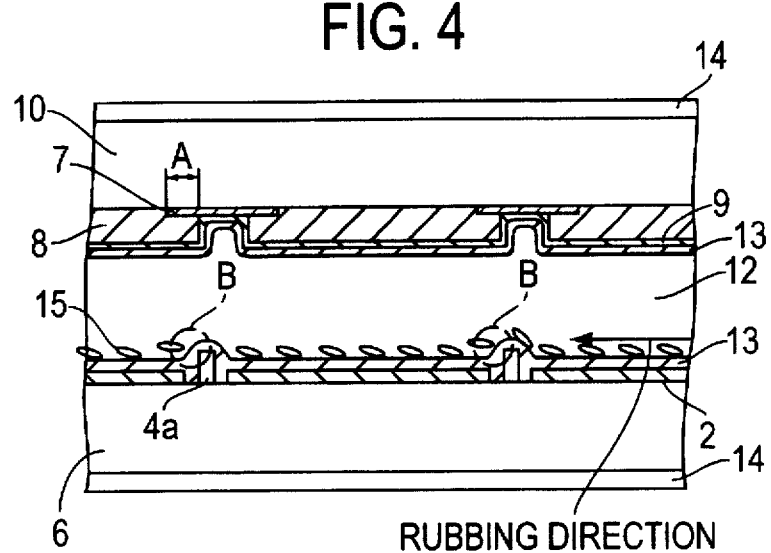
FIG. 4 is a cross-sectional view of the same color liquid-crystal display panel shown in FIG. 3.

A cross-sectional view along the X—X direction specified in FIG. 3 is shown In FIG. 4. Since the color liquid-crystal panel is a high-definition type, a narrowest line width of black-mask 7 possible from a manufacturing point of view is employed in order to obtain a highest brightness.

Therefore, the protruded area caused by source wiring 4a on array substrate 6 is turned into a rub-down area by rubbing, so that the part B of smaller pretilt angle of liquid-crystal molecule layer 15 can be closer to the indented part between the adjacent color filters 8.

Thus, in this embodiment, by making the length A of overlap of black mask 7 on color-filter 8 as long as possible, the distance between the rub down part B where the pretilt angle of liquid-crystal molecule layer 15 is smaller than that of the liquid crystal molecule layers formed in the other parts, and the indentation of color-filter 8 formed on counter substrate 10, can be made larger to make the possibilities of inverse tilt domain or inverse twist domain smallest. At the same time, the possible coincidence of the boundary to normal domain onto the opening of black-mask 7 can be avoided by making the length A larger, even if the inverse tilt domains or inverse twist domains happen to be produced.

In this embodiment, the line width of source wiring 4a is 8 μm, the line width of black-mask 7 is 30 μm, and the lengths of overlapped part of black-mask 7 over color-filter 8 is 5 μm at an area facing the rub-up of protruded area (the rub-up means the part of protrusion where rubbing is performed upwardly) formed on array substrate 6, and is 15 μm at the area facing the rub-down.

Moreover, source wiring 4a is made of aluminum thinfilm deposited at a thickness of 4000 Å. The base material and the thicknesses of red, green, and blue pixels of color-filter 8 are common, employing an acrylic resin coated at a thickness of 1.6 μm, beside the black-mask 7 is made of chromium thinfilm deposited at a thickness of 1000 Å.

The Third Embodiment

Figure 5:
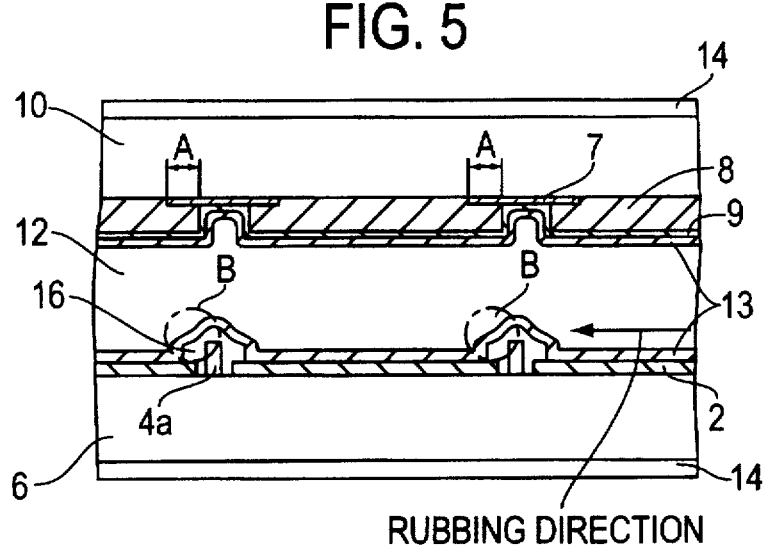
FIG. 5 is a plane showing a major part of color liquid-crystal display panel prepared according to the third embodiment of the invention.
Figure 6:
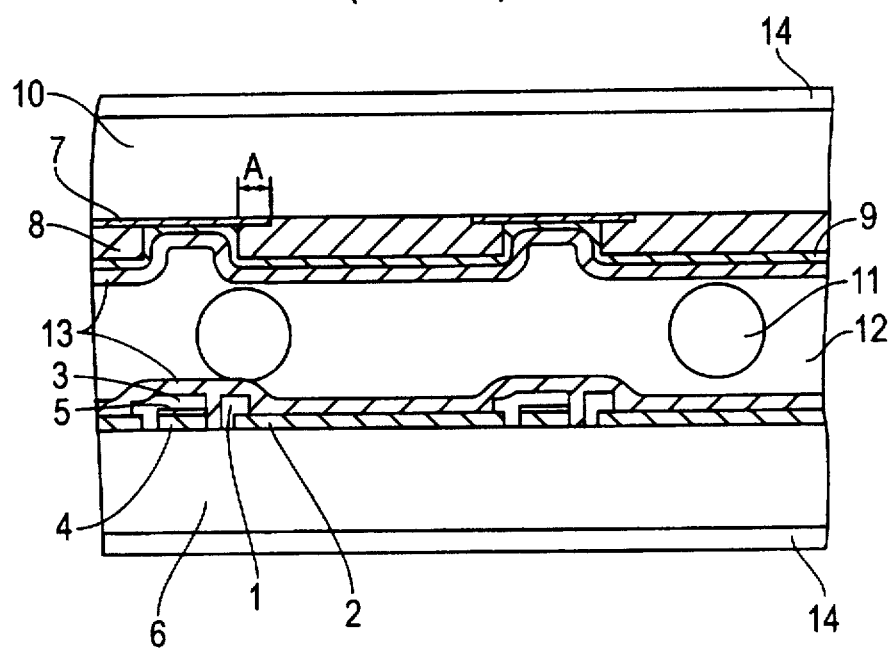
FIG. 6 is a cross-sectional view of conventional color liquid-crystal display panel.
Figure 7:
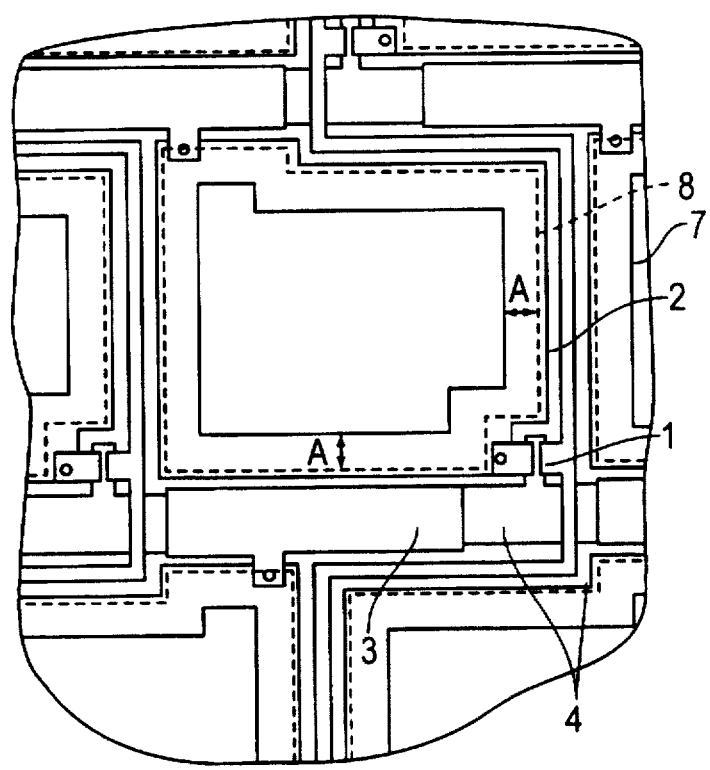
FIG. 7 is a plane showing a conventional liquid-crystal display panel.
Figure 8:
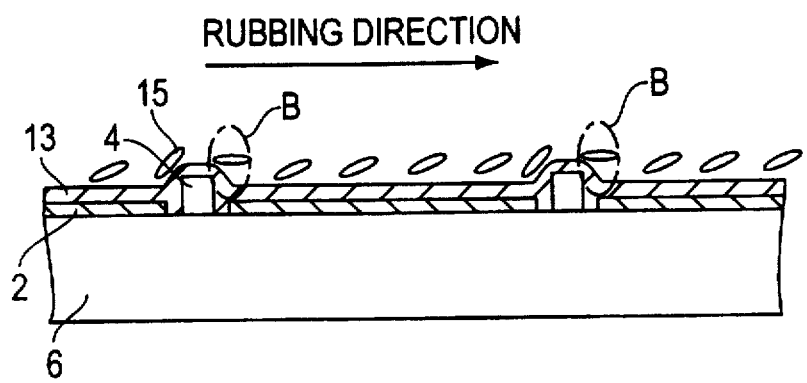
FIG. 8 is a partial cross-section of conventional color liquid-crystal display panel showing a relationship between the rubbing direction and the orientation direction of the liquid-crystal.
Figure 9:
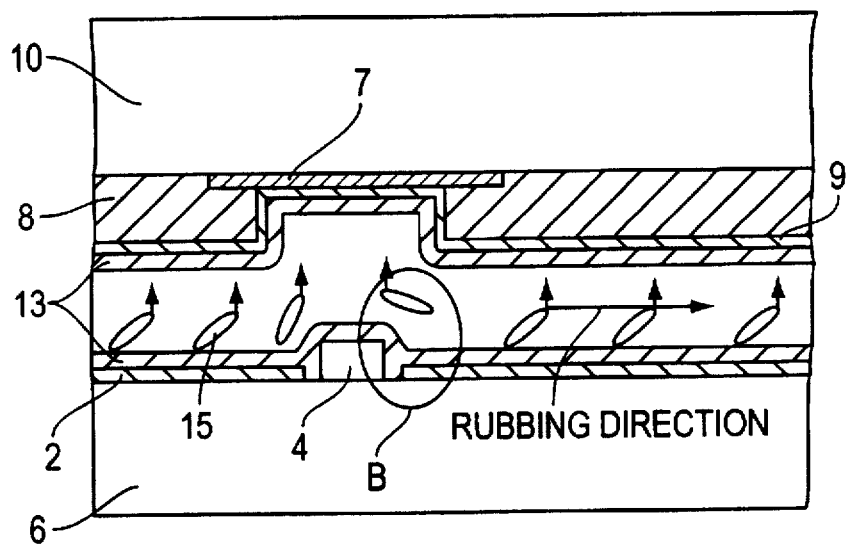
FIG. 9 is an enlarged cross-section of conventional color liquid-crystal display panel showing a pre-tilt angle at the step.

Next, a third embodiment is now explained by referring the attached drawing. FIG. 5 which shows a part of cross-section of color liquid-crystal display panel which is a third embodiment of the invention. Though the construction of the third embodiment is almost identical with that of the high-definition color liquid-crystal display panel in which the pixels shown by the second embodiment are disposed in a striped disposition, except that an inorganic insulation layer 16 is provided below orientation layer 13 of array substrate 6.

The inorganic insulation layer 16, which is made of $SiN_x$ thinfilm deposited at a thickness of 4000 Å, is disposed in order to prevent the shorts between the common electrode 9 formed on counter substrate 10 and source wiring 4a or switching element 1 formed on array substrate 6 due to foreign objects, and to prevent the accumulation of DC charge at the neighborhood of switching element 1. Moreover, said inorganic insulation layer 16 is not deposited on pixel electrode 2 as shown in FIG. 5 in order to employ a lower driving voltage of liquid-crystal 12.

In the construction of layer of array substrate 6, there could be an area free of inorganic insulation layer 16 at its edge, and this could be a rub-down area by applying a rubbing as well as source wiring 4a. Because of its large steps possible in this area, generation of inverse tilt domain or inverse twist domain is more likely within this area, and the distance to the opening of black mask 7 is very close. Therefore, the boundary to the normal domain is closer to the opening of black-mask 7 so that the chances of light leakage could be relatively high.

However, like in the case of the second embodiment, by employing a longer length A of overlap of black-mask 7 over color filter 8 facing part B which can be a rub-down part by rubbing, the closer positions of uneven part of counter electrode 10 can be masked. Therefore, the chances of generating an inverse tilt domain or inverse twist domain can be minimized so that high display quality liquid-crystal display panels without light leakage can be obtained.

The advantages of the present invention are more significant when this is applied to a type of color filter of liquid crystal display panel which is patterned by a photolithographic process performed by using a pigment dispersion photoresist and a color filter without an overcoat layer for surface leveling, that is a type of color filter where the cross-section of color filter shows an uneven shape.

The effectiveness of the present invention is still higher and essential in future where this is applied to higher-definition color liquid-crystal panel made practical by the advancements of manufacturing technologies of color filters and liquid-crystal display panels.

As above described, by employing different lengths of overlap of the black-mask over the color filter at least in a direction within a plane parallel to the substrate, a high-quality color liquid-crystal display panel having an even thickness of liquid crystal layer can be obtained without chances of destruction of the switching elements or inter-insulation layers.

Moreover, the generation of inverse tilt domain or inverse twist domain possible at the rub-down part of protrusions formed on the array substrate can be prevented so that a color liquid-crystal display panel of high display quality without light leakage can be obtained.

We claim:

1. A color liquid-crystal display panel comprising:
   a first substrate having an inner surface;
   a second substrate having an inner surface facing the inner surface of the first substrate;
   switching elements;
   pixel electrodes on the inner surface of the first substrate;
   feed wiring disposed on the inner surface of the first substrate;
   color-filters having an unevenness of more than 0.3 μm disposed adjacent to each other on the inner surface of the second substrate, each color-filter facing a corresponding pixel electrode;
   a black-mask disposed on the inner surface of the second substrate, with black-mask sections between adjacent color-filters; and an orientation layer disposed on the inner surface of each of the two substrates;

a liquid-crystal molecule layer sandwiched between the inner surfaces of the first and second substrates, wherein molecules in the liquid-crystal molecule layer are oriented along a predetermined direction by applying a rubbing to the orientation layer; and wherein for each pixel electrode the length of an overlap of the black-mask section on at least one side of the pixel electrode over the color-filter corresponding to the pixel electrode, in a cross-sectional view perpendicular to the inner surface of the first substrate, is greater than on the side opposite to the at least one side of said pixel electrode; and wherein the length of each overlap on the side of the protrusion where the rubbing is performed downwardly is greater than 10 μm.

2. A color liquid-crystal display panel comprising:

a first substrate having an inner surface;

a second substrate having an inner surface facing the inner surface of the first substrate;

pixel electrodes on the inner surface of the first substrate;

protrusions on the inner surface of the first substrate, each protrusion containing a switching element;

color-filters provided adjacent to each other on the inner surface of the second substrate, each color-filter facing a corresponding pixel electrode;

a black-mask disposed on the inner surface of the second substrate, with black-mask sections between adjacent color-filters, and with each black mask section facing a corresponding protrusion;

a liquid-crystal molecule layer sandwiched between the inner surface of the first substrate and the inner surface of the second substrate; and an orientation layer disposed over the inner surface of the first substrate and over the inner surface of the second substrate; and wherein molecules in the liquid-crystal molecule layer are oriented in a predetermined direction by applying a rubbing to the orientation layers; and wherein at each protrusion, in a cross-sectional view perpendicular to the inner surface of the first substrate, an overlap of the corresponding black-mask section over the color-filter on a side of the protrusion where the rubbing is performed downwardly is longer than over the color-filter on a side of the protrusion where the rubbing is performed upwardly; and wherein the length of each overlap on the side of the protrusion where the rubbing is performed downwardly is greater than 10 μm.

\* \* \* \* \*

UNITED STATES PATENT AND TRADEMARK OFFICE
CERTIFICATE OF CORRECTION

PATENT NO. : 5,790,219
DATED : August 4, 1998
INVENTORS : Yamagishi et al.

It is certified that error appears in the above-identified patent and that said Letter Patent is hereby corrected as shown below:

On the cover page:

In the Title, delete "RUBBING".

Column 1, line 4 delete "RUBBING".

Signed and Sealed this

First Day of August, 2000

*Attest:*

*Attesting Officer*

Q. TODD DICKINSON

*Director of Patents and Trademarks*